United States Patent
Pottharst, Jr.

[15] 3,652,183
[45] Mar. 28, 1972

[54] COMPRESSOR

[72] Inventor: John E. Pottharst, Jr., 861 Carondelet St., Parish, La.

[22] Filed: Oct. 15, 1970

[21] Appl. No.: 80,952

[52] U.S. Cl..............................415/170, 277/40, 277/91, 277/96, 415/111
[51] Int. Cl..........................................F01d 11/00
[58] Field of Search..................415/111, 170 A; 277/40, 85, 277/91, 96

[56] References Cited

UNITED STATES PATENTS

| | | | |
|---|---|---|---|
| 3,017,071 | 1/1962 | Lejk et al. | 415/170 A |
| 3,026,114 | 3/1962 | Andresen et al. | 277/40 |
| 3,117,792 | 1/1964 | Glenn et al. | 415/170 A |
| 3,239,232 | 3/1966 | Andresen | 277/40 |
| 3,272,129 | 9/1966 | Leopold | 415/170 A |
| 3,278,191 | 10/1966 | Gits et al. | 277/40 |
| 3,373,927 | 3/1968 | Miller | 415/170 A |
| 3,391,941 | 7/1968 | Donley | 415/111 |
| 3,551,067 | 12/1970 | Wissman | 415/170 A |
| 3,552,752 | 1/1971 | Lojkutz | 277/40 |

Primary Examiner—C. J. Husar
Attorney—Hyer, Eickenroht, Thompson & Turner

[57] ABSTRACT

A compressor has an impeller shaft seal that includes a first ring mounted for rotation with the shaft and an annular cartridge fixed to an outer wall of the compressor housing through which the shaft extends. A second ring of carbon is mounted within the cartridge and has an end face urged into rotary sealing engagement with a mating end face of the first ring by a wavy spring in the cartridge. An O-ring is sealingly engaged between the inner wall of the cartridge and the inner face of the second ring to protect the spring against the corrosive fluid, and a sleeve about the inner wall limits movement of the O-ring toward the spring so that portions of the inner face of the second ring removed from such fluid will slide over the O-ring upon wear of the end face of the second ring.

12 Claims, 2 Drawing Figures

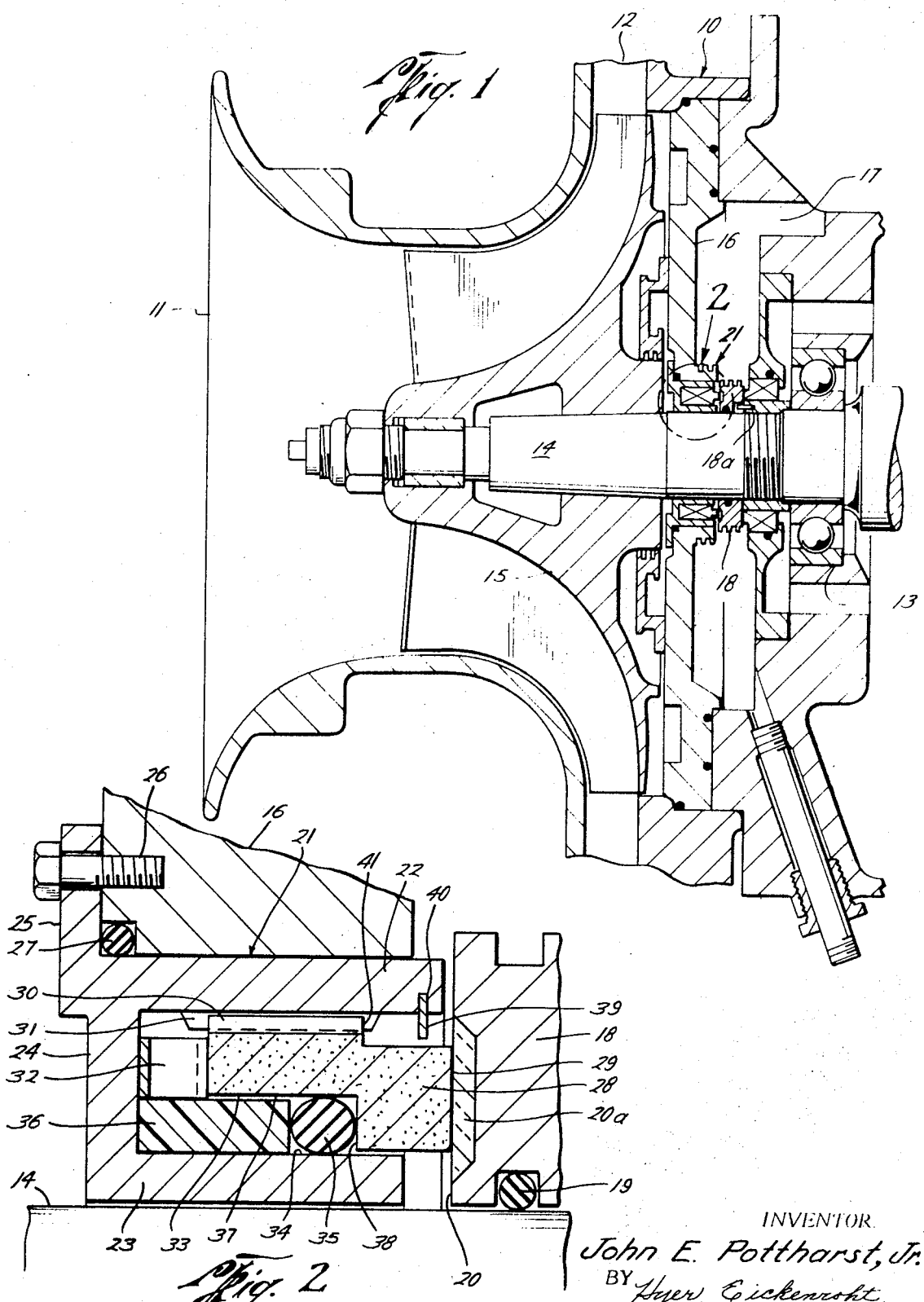

COMPRESSOR

This invention relates to an improved compressor particularly well suited for use in compressing fluids, such as saltwater steam, which not only tend to cause corrosion, but also contain foreign matter that tends to form deposits upon exposed surfaces.

In a prior compressor of the type contemplated by this invention, an outer wall of the compressor housing is sealed with respect to the shaft on which the impeller is mounted by means of a shaft seal providing primary and secondary seals. The primary seal comprises a first ring mounted for rotation with the shaft and a second ring of carbon carried within an annular cartridge fixed to the outer housing wall. The second ring has an end face which is urged by a wavy spring within the cartridge into engagement with a mating end face of the first ring to form a rotary sliding seal between them. The secondary seal comprises an O-ring which is sealably engaged between the carbon ring and the inner wall of the cartridge so as to prevent the escape of fluid from the compressor and protect the spring from the corrosive effects thereof.

However, as the end face of the carbon ring is worn away, the O-ring is caused by the spring to move axially with the second ring and thus to slide over a portion of the inner wall of the cartridge which has been exposed to the pressurized, corrosive fluid in the compressor. Because of this exposure, this portion of the cartridge is rough and therefore frequently permits leakage between it and the O-ring.

It is an object of this invention to provide a compressor of this type in which the portions of the surface relative to which the O-ring is slidable, upon wear of the carbon ring, are removed from exposure to corrosive fluid in the compressor; and, more particularly, in which the O-ring is held against movement by the spring in a manner which requires no machining or other expensive alterations of the cartridge.

Another object of the invention is to provide a compressor of this type in which the carbon ring is normally retained in the cartridge when removed from the housing wall, as during assembly of the cartridge, and yet is easily and quickly removable from the cartridge to permit its replacement.

Other objects, advantages and features of the invention will be apparent to one skilled in the art upon a consideration of the specification, the claims, and the accompanying drawings, wherein:

FIG. 1 is a sectional view of a compressor having an impeller shaft seal in accordance with this invention; and FIG. 2 is an enlarged detail of the shaft seal of the compressor indicated at "2" in FIG. 1.

The compressor shown in FIG. 1 includes a housing 10 having an inlet 11 at one end to receive the fluid to be compressed and an annular outlet 12 into which the compressed fluid is confined for passage by a wall 16 closing the opposite end of the housing. Normally, a collection chamber (not shown) surrounds the outlet. A shaft 14 extends through the wall 16, and an impeller 15 is mounted on the inner end of the shaft between inlet 11 and outlet 12. The shaft 14 is mounted in a bearing housing 13 for rotation at very high r.p.m. by a suitable power source (not shown), and there is an annular chamber 17 intermediate the wall 16 and the bearing housing which is vented to atmosphere.

The primary and secondary seals which prevent the escape of compressed fluid between the shaft and outer wall 16 to the atmosphere through the chamber 17 include a first ring 18 within the chamber 17 and connected to the shaft 14 for rotation therewith by means of a pin 18a (FIG. 1). This ring is sealed with respect to the shaft by means of an O-ring 19 to prevent the passage of compressed fluid between it and the shaft, and an annular cartridge 21 is fixed and sealed with respect to the housing wall 16 generally opposite the inner end face 20 of ring 18.

As shown, the cartridge 21 is generally C-shaped in cross section and includes an outer wall 22 which fits within the inner diameter of the outer housing wall 16, an inner wall 23 spaced about the shaft 14, and an end wall 24 connecting the inner and outer walls on the inner end of the cartridge. A flange 25 on the closed end of the cartridge is secured by bolts 26 to the housing wall 16, and the cartridge is sealed with respect to the housing wall by an O-ring 27 so that compressed fluid within the housing is confined to passage between the inner wall 23 of the cartridge and the shaft 14.

A second ring 28 of carbon, which is resistant to the corrosive action of the compressed fluid and a very good sealing material, is carried within the cartridge with its outer end face 29 projecting from the open, outer end thereof to engage the end face 20 of ring 18. More particularly, a ceramic insert 20a on the end face 20 of ring 18 provides a very hard, non-wearing surface with which the face 29 forms a primary seal against the escape of compressed fluid into atmospheric chamber 17.

As shown in FIG. 2, the ring 28 is received concentrically between the inner and outer cartridge walls and has a groove 30 on its outer face which slides axially over a spline 31 on the inner face of outer cartridge wall 22. Thus, the second ring is held against rotation with respect to the cartridge, but is free to move axially thereof. More particularly, a wavy spring 32 is disposed within the annular cartridge 21 between its end wall 24 and the second ring 28 to urge the end face 29 of the second ring against insert 20a to maintain a rotary sliding seal between said faces despite wear of the face 29.

The inner face 33 of the second ring 28 is spaced from the outer face 34 of inner wall 23 of the cartridge, and an O-ring 35 engages between them to provide a secondary seal which prevents the escape of compressed fluid to the atmospheric chamber 17 and also protects spring 32 from the corrosive effects of such fluid.

As previously mentioned, the inner face 33 of the second ring 28 and the outer face 34 of the inner wall 23 of the cartridge may become rough and uneven when exposed to the fluid, and, in the prior compressor of this type, the O-ring providing this secondary seal slides over the roughened outer face of the inner cartridge wall as the end face of the carbon ring is worn. However, in the secondary seal provided by the illustrated embodiment of this invention, a sleeve 36 is mounted closely about the inner cartridge wall between the end wall 24 and O-ring 35 so that its end limits movement of O-ring 35 along the inner cartridge wall in a direction toward spring 32 in response to pressure differential thereacross due to the compressed fluid acting over the outer side of the O-ring.

As the end face 29 of ring 28 wears, only the portion 37 of the inner face 33 of the second ring will slide over the O-ring 35, and since this portion is removed from contact with the corrosive fluid, the sliding seal between it and the outer surface of the O-ring is maintained. At the same time, since the pressure of the corrosive fluid within the compressor maintains O-ring 35 against the end of sleeve 36, there is no sliding between the inner surface of the O-ring and the outer face 34 of cartridge inner wall 23 during operation of the compressor.

A flange 38 projects inwardly from the inner face 33 of the second ring to a point close to the outer face of the inner cartridge wall. This limits movement of the O-ring 35 toward first ring 18, and thereby contains it between the ring 28 and cartridge wall 23 when the compressor is not operating or is just starting up.

The O-ring 35 is preferably coated with polytetrafluoroethylene, one example of which is known by the trademark "Teflon," or another material having substantially the same coefficient of friction. Thus, the O-ring has a surface that is extremely smooth and offers little frictional resistance to the moving second sealing ring 28.

As shown, the outer face 34 of inner cartridge wall 23 has a uniform outer diameter over which sleeve 36 is installed. The end of the sleeve abuts the end wall 24 of the cartridge, and spring 32 is guidably slidable about it. Preferably, the sleeve is cemented to the inner cartridge wall so that it will remain properly positioned while spring 32, O-ring 35 and second ring 28 are being installed in cartridge 21. Also, sleeve 36 is made of a material having a coefficient of friction substantially that of polytetrafluoroethyline, one example of which is known by the trademark "Teflon," so that the spring slides easily over it.

Of course, the first ring 18 maintains second ring 28 in the cartridge when the cartridge is mounted on the housing wall. In order to maintain the second ring in the cartridge prior to installation of the cartridge, a snap ring 39 is mounted within a groove 40 in outer cartridge wall 22 to engage a shoulder 41 on the second ring 28. As shown, the ring 39 is spaced a sufficient distance from shoulder 41 to avoid interfering with normal movement of the second ring as its end face 29 wears. Upon removal of the cartridge from the installed position, the snap ring may be removed from the groove 40 to permit the second ring 28 to be replaced independently of the remainder of the cartridge.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the apparatus of this invention without departing from the scope thereof, it is to be understood that all matter herein set forth or shown in the accompanying drawings is to be interpreted as illustrative and not in a limiting sense.

The invention having been described, what is claimed is:

1. A compressor for a corrosive fluid, comprising a housing having an inlet and an outlet, a shaft mounted for rotation in the housing and extending through a wall of the housing, an impeller mounted on the shaft for rotation in the housing between the inlet and outlet, and means sealing between the housing wall and the shaft against the escape of compressed corrosive fluid from the housing, the sealing means comprising a first ring being sealed about and mounted for rotation with the shaft, the first ring having an end face, an annular cartridge having an inner wall and an end wall mounted about the shaft and fixed and sealed to the housing wall such that compressed fluid is confined to passage between the cartridge inner wall and the shaft, a second ring of carbon disposed between the inner and outer cartridge walls and including an inner face spaced from the outer face of the inner cartridge wall and an end face, the second ring being mounted for axial movement with respect to the cartridge but against rotation with respect thereto, a spring in the cartridge urging the end face of the second ring into contact with the end face of the first ring to form a rotary sliding seal therebetween during rotation of the shaft, the outer face of the inner cartridge wall having a substantially uniform diameter, a resilient sealing ring disposed between and in sealing engagement with the outer face of the inner cartridge wall and the inner face of the second ring, and a sleeve mounted closely about said outer face of the inner cartridge wall and between the resilient sealing ring and the cartridge end wall in order to limit movement of the resilient ring toward the cartridge end wall so that, upon wear of the end face of the second ring, only portions of the inner face of the second ring that have been protected from exposure to the compressed corrosive fluid will sealingly engage the outer surface of the resilient ring.

2. The compressor of claim 1, wherein the inner face of the second ring has an inwardly projecting flange to limit movement of the resilient ring away from the cartridge end wall and thereby prevent its being displaced from sealing engagement between the inner face of the second ring and the outer face of the inner cartridge wall.

3. The compressor of claim 1, wherein the spring is mounted about the outer surface of the sleeve, and the outer surface of the sleeve having a coefficient of friction substantially that of polytetrafluoroethylene.

4. The compressor of claim 1, wherein the resilient ring is an O-ring coated with a material having a coefficient of friction substantially that of polytetrafluoroethylene.

5. The compressor of claim 1, wherein the sleeve abuts the cartridge end wall.

6. The compressor of claim 5, wherein the sleeve is secured to the cartridge.

7. The compressor of claim 1, wherein the spring is a wavy spring disposed between the end wall of the cartridge and the second ring.

8. The compressor of claim 1, wherein the outer wall of the annular cartridge has a spline therein, and the outer face of the second ring has a groove slidable over the spline.

9. A compressor for a corrosive fluid, comprising a housing having an inlet and an outlet, a shaft mounted for rotation in the housing and extending through a wall of the housing, an impeller mounted on the shaft from rotation within the housing between the inlet and outlet, and means for sealing between the housing wall and the shaft against the escape of compressed corrosive fluid from the housing, the sealing means comprising a first ring mounted on and sealed about the shaft for rotation with the shaft and having an end face, an annular cartridge having an outer wall, an inner wall and an end wall and being mounted about the shaft and fixed and sealed to the compressor housing wall such that compressed fluid is confined to a passage between the cartridge inner wall and the shaft, a second ring of carbon mounted between the inner and outer cartridge walls against rotation with respect thereto and for axial movement with respect thereto into and out of the cartridge, said second ring including an inner face spaced from inner cartridge wall and an end face, a spring within the cartridge urging the end face of the second ring into contact with the end face of the first ring to provide a rotary sliding seal between the faces, a resilient sealing ring disposed between and in sealing engagement with the inner face of the second ring and the inner wall of the cartridge, and means removably mounted on the outer wall of the cartridge to retain the second ring in the cartridge.

10. The compressor of claim 9, wherein the removably mounted retaining means is a ring.

11. The compressor of claim 9, wherein the outer cartridge wall has a spline thereon and the outer face of the second ring has a groove therein slidable over the spline.

12. The compressor of claim 9, wherein the outer cartridge wall has a groove in which the retaining means is mounted.

* * * * *